No. 636,133.　　　　　　　　　　　　　　Patented Oct. 31, 1899.
E. D. GOODSON.
BICYCLE THEFT GUARD.
(Application filed Feb. 7, 1899.)
(No Model.)
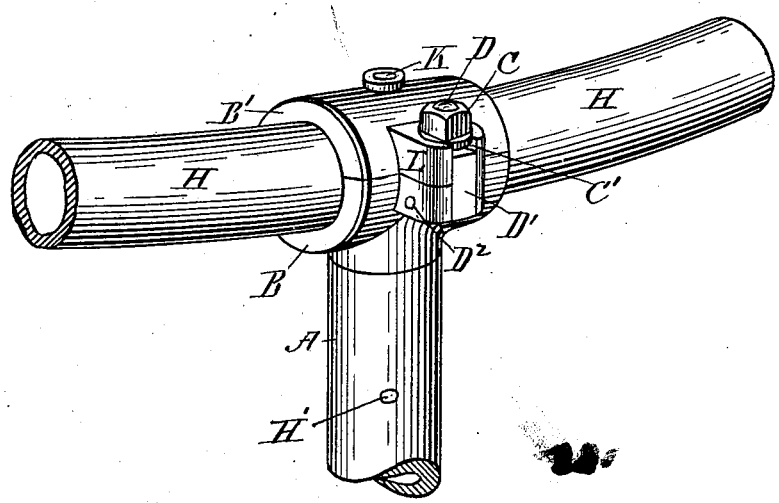
Fig. 1.
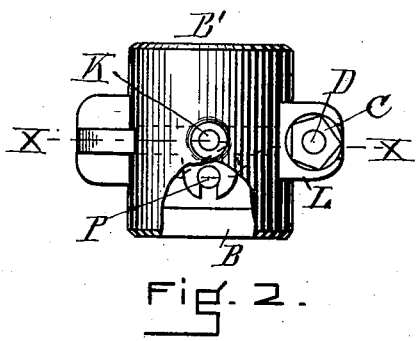
Fig. 2.
Fig. 4.
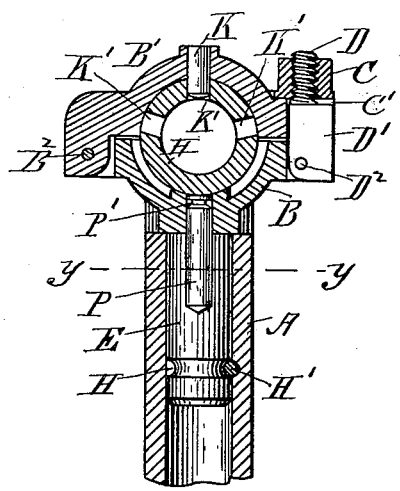
Fig. 3.
Fig. 5.
WITNESSES
Frank G. Parker
Frank G. Hattie
INVENTOR
Edward D. Goodson

UNITED STATES PATENT OFFICE.

EDWARD D. GOODSON, OF BOSTON, MASSACHUSETTS.

BICYCLE THEFT-GUARD.

SPECIFICATION forming part of Letters Patent No. 636,133, dated October 31, 1899.

Application filed February 7, 1899. Serial No. 704,820. (No model.)

*To all whom it may concern:*

Be it known that I, EDWARD D. GOODSON, of Boston, in the county of Suffolk and State of Massachusetts, have invented a new and useful Improvement in Bicycle Theft-Guards, of which the following, taken in connection with the accompanying drawings, is a specification.

My invention relates to a device by which the handle-bar of a bicycle may be made entirely inoperative for guiding; and it consists in means by which the operator can by a slight manipulation render the handle-bar useless for guiding the bicycle, the object being to prevent any unauthorized person from using or stealing the bicycle. This object I attain by the mechanism illustrated in the accompanying drawings, in which—

Figure 1 is a perspective view showing the upper part of a handle-bar stem and parts of the handle-bar and connections. Fig. 2 is a plan showing the coupling that connects the handle-bars to the handle-bar stem, a part being represented as broken away to show the interior. Fig. 3 is a vertical section taken on line X X of Fig. 2. Fig. 4 is a cross-section taken on line Y Y of Fig. 3. Fig. 5 shows in perspective one of the details.

In the drawings the handle-bar stem is indicated by A, and the handle-bar by H H. The coupling for uniting the handle-bar H H to the stem A has a cylindrical projection E extending downward into the stem A. This projection E is rigidly connected to the coupling B B', but can turn freely in the stem A, and is held from being drawn out of the stem by a pin H', which engages with the groove H. The handle-bar is prevented from slipping or rotating in the coupling B B' by the stud K, which engages with one of the openings K' K' K'. (See Fig. 3.) By this construction the handle-bar may be adjusted to suit the user. The coupling is made, as shown, in two parts. The part B' is hinged by the pivot B² to the lower part. The two parts B' and B are held together by a latch-piece D'. (See Fig. 3.) This latch-piece is pivoted to the lower part by the pin D² and has a screw-stud D at its upper end, upon which a screw-nut C engages. The screw-nut C when turned on fits into a recess C', so that the swinging latch-piece D' cannot be swung out of connection unless the screw-nut C is turned so as to rise above the upper surface of the lug L. Then the latch can be swung outward, so as to clear the lug L and allow the part B to be opened, so that the handle-bar H H may be adjusted or removed.

To prevent the handle-bar from swinging when the bicycle is in use, I have a pin P. (Shown in full in Fig. 5.) This pin fits in a keyway made in the part E and in the stem A. (See Fig. 4.) It is obvious that when the pin P is in position the part E will be locked, so as not to rotate in the stem A—that is, the handle-bar is firmly connected to the stem, so that the bicycle can be guided; but when the pin P is out of the keyway then the projection E is free to swing and the handle-bar will be entirely inoperative for guiding the bicycle. To remove the pin P, the owner of the bicycle has only to loosen the screw-nut C, swing out the latch D', and open the part B', and then the pin P may be drawn out of the keyway by inserting the point of a pin or knife-blade into the groove P'. (See Fig. 5.) The owner can take the pin with him and leave his bicycle in a condition in which it cannot be used, as it is unguidable.

I claim—

In a bicycle, the combination of a handle-bar, a coupling adapted to detachably hold said handle-bar, and having a cylindrical projection extending downward into the stem and swivelingly held therein by an annular groove and cross-pin, a vertical locking-pin, located directly under the handle-bar, whereby it is removable only when the handle-bar is taken out, and adapted to engage with slots made in the interior surface of the stem and in the surface of the said projection; substantially as and for the purpose set forth.

In testimony whereof I have signed my name to this specification, in the presence of two subscribing witnesses, on this 6th day of February, A. D. 1899.

EDWARD D. GOODSON.

Witnesses:
 FRANK G. PARKER,
 FRANK G. HATTIE.